April 12, 1960  W. L. BUTLER  2,932,707
MANUAL MOTOR STARTER
Filed March 14, 1958  3 Sheets-Sheet 1
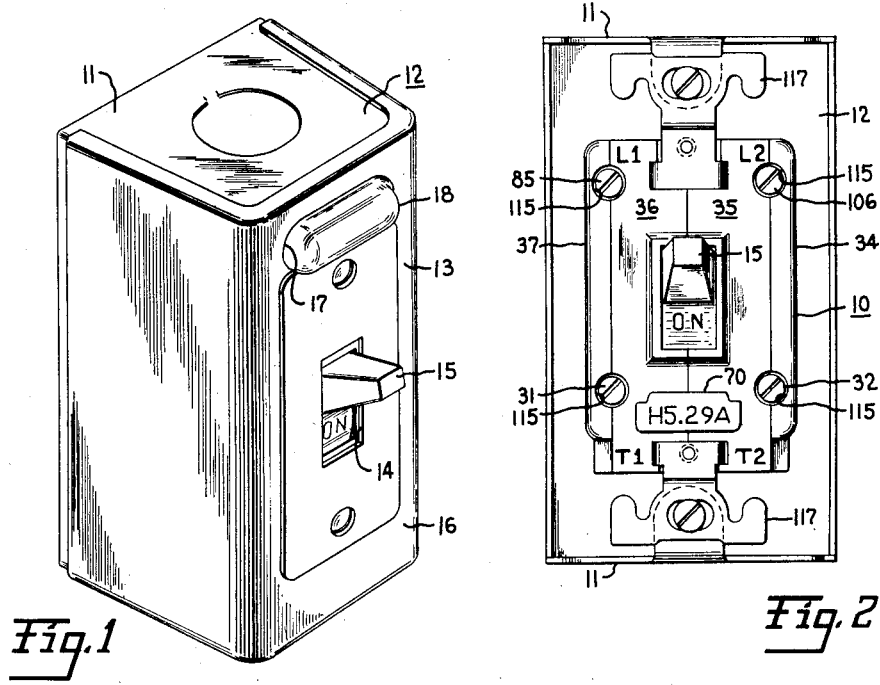
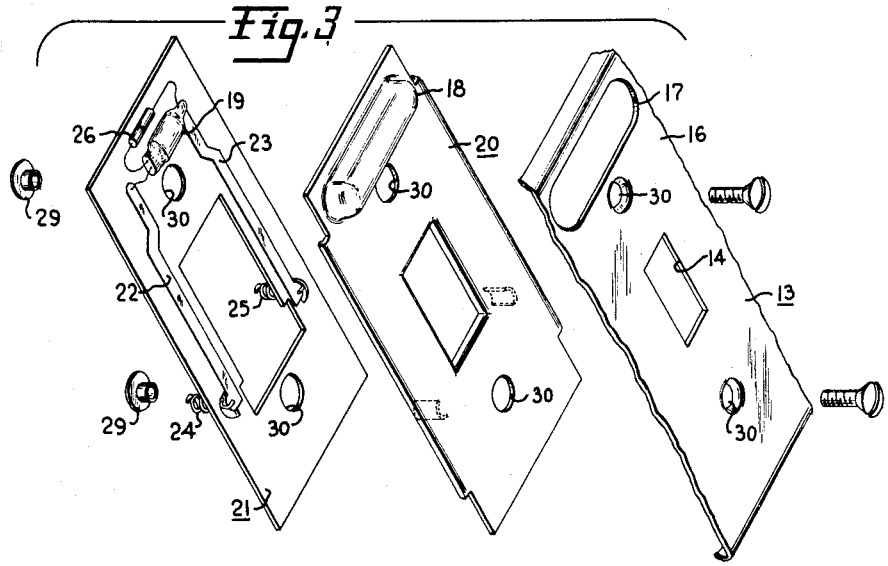
INVENTOR.
WILLIAM LAWRENCE BUTLER
BY Martin Kalikow
ATTORNEY

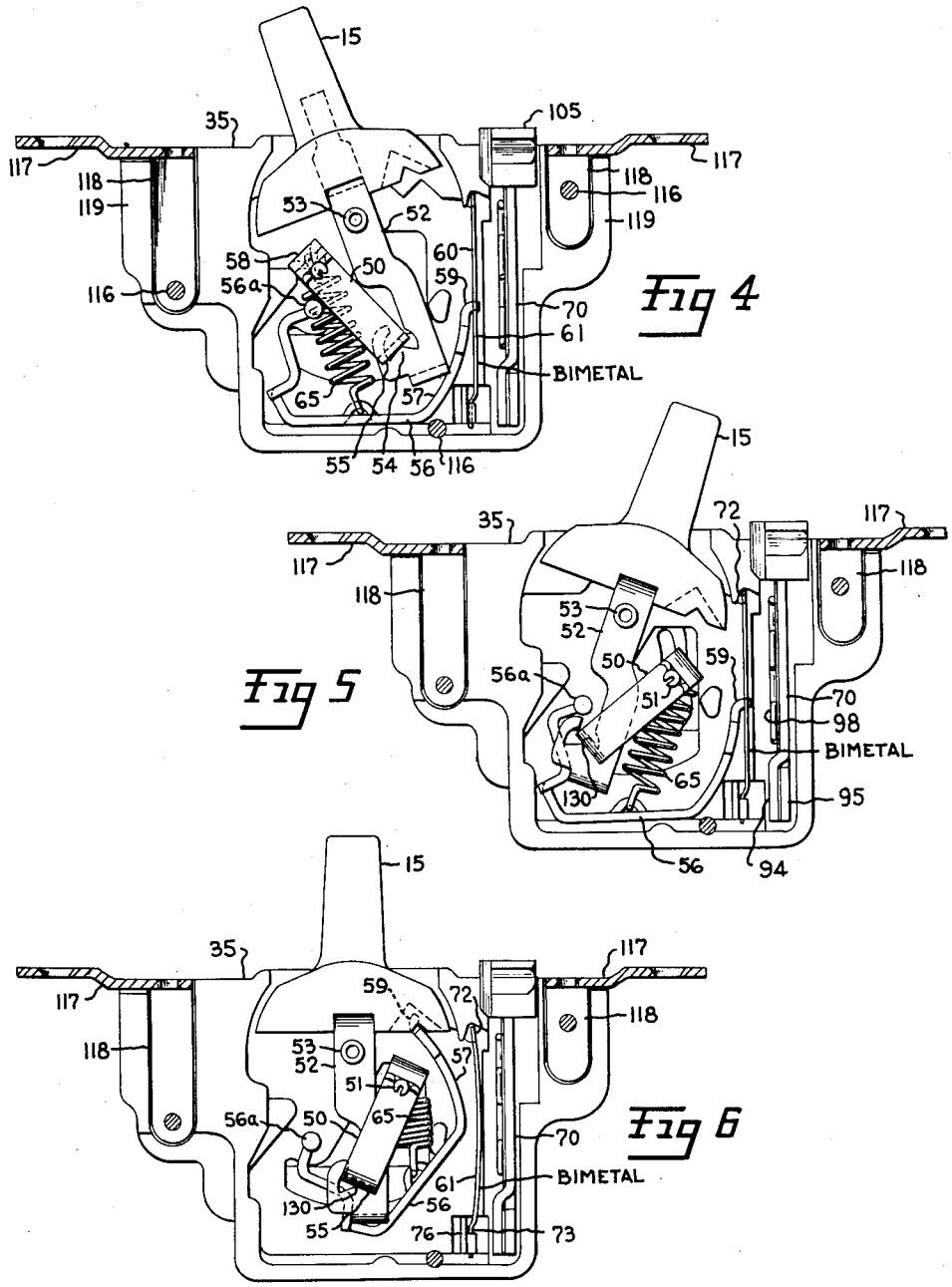

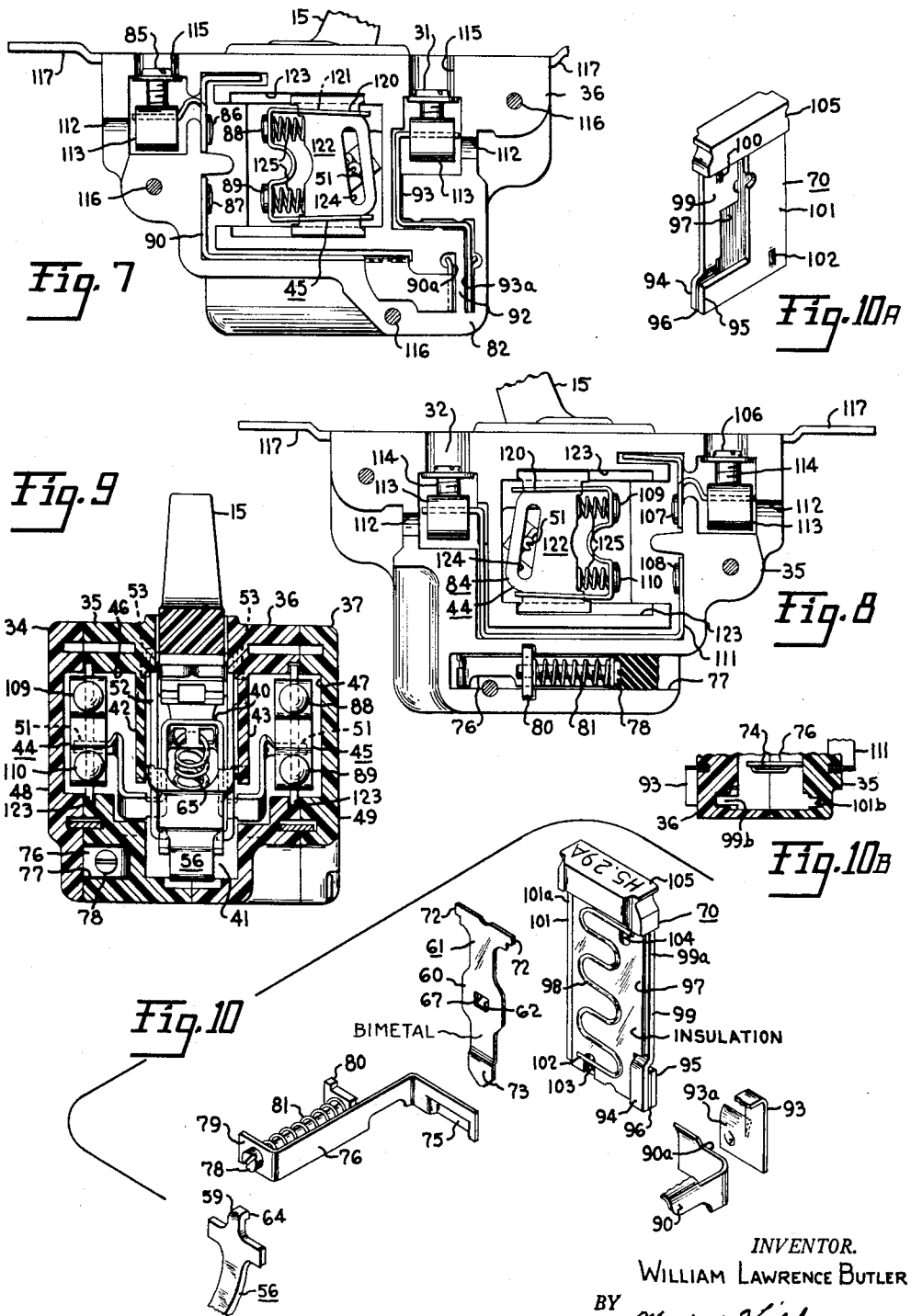

United States Patent Office 2,932,707
Patented Apr. 12, 1960

2,932,707

MANUAL MOTOR STARTER

William Lawrence Butler, Bloomington, Ill., assignor to General Electric Company, a corporation of New York Application March 14, 1958, Serial No. 721,523

5 Claims. (Cl. 200—116)

My invention relates to electric control devices and more particularly to manually and thermally operable switching devices for controlling and protecting motor, lighting, and other low and moderate power electric circuits.

Small manually and thermally operated switching devices especially those intended to control the operation of small motor circuits are often adapted to be mounted in small metal wall boxes of standard dimensions. It is desirable, therefore, that the dimensions of the switching device be made as small as possible in order to increase the available wiring space within the wall box above and behind the switching device. It is also desirable that the same switching device be usable with circuits having different electrical loads such as, for example, provided by motors of different horsepower ratings. In this connection, it is convenient that the heating element in the device be easily replaceable, and a switching device having plug-in type heaters is described and claimed in copending application Serial Number 706,679 filed January 2, 1958 by William A. Thomas and assigned to the present assignee.

In such devices it is also important that the thermal tripping means have great sensitivity to heat radiating from the various heating elements. Such high sensitivity tripping means have, however, generally been fragile and difficult to calibrate and subject to nuisance actuation due to vibration or shock.

Accordingly, one object of the invention is to provide a manually and thermally operable switching device suitable for controlling the energization of fractional horsepower motors and having unusually small size for a given horsepower rating.

Another object of my invention is to provide an electric control device having a thermal tripping means which is highly sensitive to radiant heat energy and yet has good mechanical strength, may be easily calibrated, and is relatively unaffected by vibration or shock. A further object of the invention is to provide an improved plug-in type heater for such devices and an improved mounting means therefor.

In general, in accord with one aspect of the invention, a control device is provided having a bimetal strip and a control member latched to and extending on the low expansion side of the strip. This permits a heating element to be located alongside and in direct heat radiating influence with the high expansion side of the strip. Means are then provided for supporting the strip in a manner such that the strip when heated moves toward rather than away from the heater to release the control member. In accord with one form of the invention this is accomplished by latching the control member to an aperture in a widened central portion of the bimetal strip and restraining the strip at its opposite ends against substantial transverse movement while permitting the strip to move longitudinally at one end whereby the strip bows outwardly when heated to release the control member. This construction also provides a substantially shock-proof thermal tripping means, and enables calibration of the tripping temperature by a simple adjustment in the transverse position of one end of the bimetal strip.

In accord with a further feature of the invention, the overall size of the device is reduced by locating the operating mechanism on one side of the bimetal strip with the trip control member extending arcuately from the rear of the operating mechanism into latched engagement with the bimetal such that, upon release, the tripping member describes an arc around the operating mechanism to a position alongside the bimetal strip. For even greater compactness, the calibrating means and the means for making plug-in connection to the heating element are located at the rear of the housing on opposite sides of the operating mechanism.

The novel features believed characteristic of the invention are set forth in the appended claims. The invention itself, however, together with further objects and advantages thereof may be easily understood by referring to the following description taken in connection with the accompanying drawings in which, Figure 1 is a perspective view of a manual motor starter within its enclosing wall box;

Figure 2 is a front view of the manual motor starter of Figure 1 with the front cover of the wall box removed;

Figure 3 is an exploded perspective view of the indicating light construction on the front cover of the wall box;

Figures 4, 5 and 6 are central sectional views of the manual motor starter of Figure 2 showing the operating mechanism in "on," "off," and "tripped" positions respectively;

Figure 7 and Figure 8 are respective views of the opposite sides of the manual motor starter of Figure 2 with the respective side wall covering plates removed;

Figure 9 is a transverse cross-sectional view of the manual motor starter of Figure 2;

Figure 10 is an exploded perspective view of the thermal tripping mechanism of the invention;

Figure 10A is a perspective view of the heating element shown in Figure 10, and

Figure 10B is a sectional view of the lower end portion of the central section of the housing showing the heater mounting tracks.

Referring to Figures 1, 2 and 3 the invention is shown in one form as comprising a switching device such as manual motor starter 10 mounted on top and bottom flanges 11 of a metal enclosing box or case 12. Box 12 includes a wrap-around front cover 13 of U-shaped cross-section having a rectangular aperture 14 in its front wall to accommodate the operating handle 15 of the manual motor starter 10. The front surface 16 of cover 13 also has a transverse elliptical opening 17 at the top to accommodate a protruding plastic shell 18 surrounding an indicating lamp 19.

As best seen in Figure 3, lamp shell 18 is attached to or formed out of an insulating sheet 20 interposed between the front wall 16 of cover 13 and another insulating board 21 supporting lamp 19 and the means for making electrical connection thereto. These connections preferably comprise a pair of conductive strips 22 and 23 printed or otherwise deposited on the front surface of board 21 and extending from the terminals of lamp 19 to a pair of conducting metal springs 24, 25 extending through board 21 toward the rear of the enclosure. A resistor 26 may be connected in series or in parallel with lamp 19 to limit the current therethrough. Lamp 19 and resistor 26 fit within the protruding shell 18 of the intermediate insulating sheet 20 when the board 21 and sheet 20 are fastened to the front wall 16 of the enclosing cover by such means as rivets 29 extending through suitably registering holes 30. Conducting springs 24 and 25 make resilient contact with the screw heads of load terminals 31 and 32 of the manual motor starter 10 when the starter 10 is in mounted position within box 12.

Referring now to Figure 2 and Figures 4 through 10 the manual motor starter 10 itself comprises an insulating housing split longitudinally along planes extending from front to rear of the device into four sections 34, 35, 36 and 37, the two outer sections 34 and 37 also constituting the side walls of the housing.

The general arrangement of the switching mechanism within these housing sections is shown in Figure 9. An operating mechanism indicated generally at 40 is located within a central longitudinally extending chamber 41 defined by the side partitions 42, 43 of central housing sections 35 and 36. A pair of switching assemblies 44 and 45 are located in outer chambers 46 and 47 respectively on opposite sides of central chamber 41. These outer chambers 46 and 47 are defined by the partitions 42 and 43 of sections 35 and 36 and by the outer side walls 48, 49 of the outer sections 34 and 37.

The operating mechanism 40 includes a W-shaped switching member 50 having laterally extending pins 51 at its opposite free ends which engage and actuate the switching assemblies 44 and 45 respectively. The switch operating mechanism also includes the insulating handle 15 and a U-shaped metal operating member 52 fastened to handle 15 and pivoted by cylindrical bosses 53 within the inner partitions 42 and 43. This U-shaped operating member 52 has a hook-like formation 54, best seen in Figures 4, 5 and 6 at each lower free end upon which the lower bights 55 of the W-shaped switching member 50 are pivotally mounted. A trip control member 56 in the form of a generally U-shaped metal strip with a curved body portion 57 has one end pivoted by means of integrally-formed hinge pins 56a extending within the inner partition walls 42 and 43. The other free end 59 of trip control member 56 is latched to the enlarged central body portion 60 of a thermally responsive element in the form of a thin bimetal strip 61, best seen in Figure 10. Bimetal strip 61 has a rectangular aperture 62 in the enlarged central portion 60, and the end 59 of the control member 57 has a slight hook 64 which, in the latched condition, extends within rectangular aperture 62 to overlap the bimetal strip 61. An over center spring 65 connected between the upper bight of the W-shaped switching member and the trip control member 56 serves both to bias the switching member 50 rearwardly into pivotal engagement with the handle operating member 52 and also to bias the hooked end 64 and the trip control member 56 forwardly into latched engagement with the upper rim 67 defining the aperture 62 of bimetal strip 61. An electric heating element 70 extends within a front-to-rear transverse chamber of the housing sections 35 and 36 below the switch operating mechanism 40 and alongside the bimetal strip 61. Heating element 70 is located adjacent the high expansion side of bimetal strip 61 while the control member 56 extends from the bimetal along its opposite low expansion side.

In accord with one aspect of the invention, means are provided for restraining the opposite ends of the bimetal strip 61 against transverse movement while permitting longitudinal movement of at least one end. In the embodiment shown, bimetal strip 61 is pivoted on laterally extending shoulders 72 at the front end of the bimetal strip within suitable bearing surfaces of the inner partitions 42 and 43. The other or rear end 73 of bimetal strip 61 is inserted as a loose longitudinally slidable fit within a slot 74 formed between offset portions 75 at one end of a Z-shaped supporting metal strip member 76. As best shown in Figures 8, 9 and 10, supporting strip 76 extends within an elongated channel 77 along the rear of the housing below one switching assembly 44 and beside the rear of the central chamber 41 for the operating mechanism 40. Strip member 76 is dimensioned as a slidable fit within the elongated channel 77 and is held in place by an adjusting screw 78 passing through the head 79 of strip 76 and threaded into a nut 80 trapped within the sides of channel 77. A helical spring 81 extends between nut 80 and the head 79 of supporting strip 76 thereby to bias the strip into predetermined longitudinal position depending upon the adjustment of screw 78. Adjustment of screw 78 thus varies the transverse position of the rear end 73 of bimetal strip 61 to control the amount of overlap in the latched engagement between the end 64 of control member 56 and the bimetal strip 61 thereby to calibrate the tripping temperature.

The electrically conducting parts of the device are best seen in Figures 7, 8 and 9. On one side of switching device 10, line terminal 85 is connected to the forward one of a pair of stationary terminals 86, 87 arranged to be connected together in the closed position of switching assembly 45 by bridging contacts 88 and 89 on the movable carrier 84 of switching assembly 45. Rear stationary contact 87 is connected by means of a conducting strip 90 extending below switching assembly 45 to a lower rear corner 82 of switching device 10 below load terminal 31. The free end of conducting strip 90 is return bent as shown in Figure 10 to form one contacting surface 90a of a plug-in terminal receiving jack 92 for the heating element 70. Another conducting metal strip 93 connected to load terminal 31 and extending to the same lower corner 82 of device 10 contains the other contacting surface 93a confronting the contacting surface 90a and forming the remaining jaw of the jack 92. It will be observed that contacting surfaces 90a and 93a are electrically isolated from one another.

Heater element 70 is connected between surfaces 90a and 93a in series with terminals 85 and 31. As best seen in Figures 10 and 10A heater element 70 carries a pair of plug-in terminals 94, 95 at its lower corner electrically separated by a rear corner portion 96 of an insulating sheet 97, preferably of mica, extending the full length of heater element 70. A resistance heating wire 98 extends in a tortuous path along one side of insulating sheet 97 confronting the bimetal strip 61. One of the plug-in terminals 94 formed out of a conducting strap 99 extending along the remote or non-heating side of insulating sheet 97 and connected to the upper end 100 of the resistance wire 98. The other plug-in terminal 95 is formed out of another conducting strap 101 extending beside strap 99 along the remote side of insulating sheet 97 and connected to the lower end 102 of resistance wire 98; the insulating sheet 97 being cut away as at 103 and 104 to permit soldered connections to the resistance wire. Conductive straps 99 and 101 are spaced from one another on the remote side of insulating sheet 97 with their upper ends embedded within an insulating handle portion 105. The opposite side edges 99A and 101A of straps 99 and 101 extend beyond insulating sheet 97 to form rails which fit within tracks or channels 99B and 101B respectively of section 36 and 35. When heater element 70 is plugged into motor starter 10 alongside bimetal strip 61, plug-in terminals 94 and 95 make contact respectively with contact surfaces 90a and 93a of jack 92, and handle 105 extends slightly beyond the upper surface of device 10 as shown in Figure 4.

The other pole of the motor starter 10 extends along the opposite side of the switching mechanism 40 and is best seen in Figure 8. Line terminal 106 is connected to the forward one of a pair of stationary contacts 107, 108 arranged to be bridged in the closed position of the device by contacts 109 and 110 on the movable carrier of switching assembly 44. Rear stationary contact 108 is connected by a conducting strap 111 directly to load terminal 32. It will be observed that all of the line and load terminals 31, 32, 85 and 106 are arranged to receive the bare ends of wires inserted into the device through apertures 112 in opposite end walls thereof. The wires are threaded into lugs 113 of each terminal carried by the respective terminals and are tightly clasped within the light lugs by a tightening down of the terminal screws 114 by a screw driver inserted through suitable openings 115 extending from the front surface of the starter 10.

Switching assemblies 44 and 45 each comprise a U-shaped conducting strip 120 carrying their respective pairs of movable contacts 88, 89 and 109, 110 at the bight of the U and having aligned slots 121 in their opposite free end portions. An insulating plate 122 extends through these slots 121 into suitable guide tracks 123 in the housing sections 35 and 36. Insulating plates 122 have a slot 124 extending from front to rear at a slight angle within which the end pins 51 of the W-shaped switching member 50 are inserted. Contact springs 125 extend between the contact carrying portion of U-shaped member 120 and the insulating plate 122. The swinging movement of the switching member 50 is translated into a reciprocation of the switching assembly by movement of pin 51 within slot 124.

The entire assembly including the four housing sections 34, 35, 36 and 37 are held together by three transverse studs 116. The device also carries a pair of mounting flanges 117 at opposite ends having downwardly depending ears 118 within opposite end portions 119 of the device, these ears being secured in place by the passage of the studs 116 therethrough.

Referring to Figures 4, 5 and 6, the operation of switching mechanism 40 will now be described. In the "on" position illustrated in Figure 4, over-center spring 65 holds the swingable end portions 58 of W-shaped switching member 50 above the pivot 53 of handle operating member 52. The pivoted end 55 of the switching member 50 is also biased against the lower hooked end 54 of the operating member 52 below the axis of over-center spring 65. Over-center spring 65 also biases the end 59 of trip control member 56 into latched engagement with bimetal strip 61. Movement of handle 15 downwardly or to the right, as indicated in Figure 5, carries the rear hooked end of the handle operating member 52 upwardly (to the left in Figures 4-6) across the line of action of over-center spring 65 thereby causing spring 65 to move the swingable ends 58 of switching member 50 downwardly (to the right in Figures 4-6) across the operating member 52 to the other side of pivot 53. The pins 51 on the swingable ends 58 of switching member 50 carry the switching assemblies 44 and 45 downwardly to break the engagement between the movable and stationary contacts of the device. The pivoted ends 55 of switching member 50 rocks on the apex of a slight hill 130 formed in the lower hooked ends 54 of U-shaped operating member 52. During its swinging motion, the side edges of the inner portion of switching member 50 strikes the upper pivoted end of trip control member 56 thereby to pry loose any welds that may possibly have occurred between the contacts.

Upon the occurrence of a sustained overload current, the additional heat radiating from heating element 70 causes the rear lower end 73 of bimetal strip 61 to tend to move to the left as viewed in Figure 6 away from the heating element 70. This lower end 73 is loosely restrained against transverse movement by the supporting strip 76. However, since the strip is free to move longitudinally within the slot 74 formed by the offset portions 75 of this supporting member 76, the central portion 63 of bimetal strip 61 is free to bend or bow about its upper pivot 72 toward the heating element 70 and away from the hooked end 64 of trip control member 56. This bowing movement of bimetal strip 61 releases the end 64 of trip control member 56 which moves forwardly toward handle 15 under the influence of over-center spring 65. Because of the curved configuration of trip control member 56, it passes alongside the bi-metal strip to a position substantially parallel thereto without interfering with the operating mechanism 40.

Presuming that switching device 10 was in the "on" position before tripping, the pivotal motion of tripping member 56 carries the lower end of over-center spring 65 across the lower pivot of switching member 50 thereby to carry the upper swingable ends of the switching member 50 toward the "off" position with a snap action. This movement of the switching member causes the switching assemblies to be carried downwardly (to the right in Figures 4-6) and break the engagement between the contacts thereby to open the circuits of the switching device. This pivotal movement of trip control member 56 also permits the upper end 58 of the switching member 50 to be moved slightly forwardly thereby carrying its pivot and the operating member 52 to a position intermediate its "on" or "off" position in which position the handle 15 indicates that the device has been tripped. Once the circuit between line and load terminals 85 and 31 is broken, current no longer flows through heating element 70, and the bimetal 61 cools to return to its normally straight condition in which it can again be latched to the tripping control member 56. Resetting is accomplished by moving handle 15 to the "off" position. During this movement to the "off" position the lower end of handle operating member 52 strikes the upper portion of trip control member 56 to pivot the free end 59 of the trip control member 56 once again into latched engagement with the bimetal strip 61.

If it is desired to vary the characteristics of the switching device in order to match different load devices, it is necessary only to replace heating element 70 with a heating element of different rating by a simple plug-in operation. The heating element 70 may be withdrawn by merely grasping the exposed end of its handle 105 and pulling the heating element forward to bring the plug-in terminals 94 and 95 out of frictional engagement with the contacting surfaces 90a and 93a of jack 92. A substitute heater may be replaced by a simple plug-in motion.

It will thus be seen that I have provided an unusually small and compact switching device of great versatility and convenience of application. Bimetal element 61 is preferably composed of unusually thin strips of dissimilar metals whereby it achieves greater deflection for a given temperature. The widening of the central portion of the bimetal creates a greater heat absorbing surface to further increase its sensitivity. In addition, the sensitivity of the device is further increased by the fact that the heat from the heating element 70 strikes directly upon the high expansion side of the bimetal strip 61. Because of the particular latching arrangement to the central body of the bimetal strip, it will be appreciated that a thinner bimetal strip may be employed than if the control member is latched to the end of the bimetal strip in the conventional manner. This is because the support of the bimetal strip at its opposite ends provides greater mechanical strength to the tripping assembly and also prevents unlatching of the control member even when the starter is subjected to moderate vibration or shock. Calibration of the tripping temperature is easily achieved by a simple adjustment in the transverse position of the lower end of the bimetal strip.

While I have described above a specific embodiment of the invention, many modifications may be made and I intend by the appended claims to cover all such modifications as fall within the true spirit and scope of the invention.

What I claim as new and desire to secure by Letters Patent of the United States is:

1. A thermally responsive control device comprising a bimetal strip having a widened central portion with an aperture therethrough, a movable control member having an end portion extending through said aperture, means biasing said control member for latched engagement of said end portion on the rim of said strip defining said aperture, and means for restraining said strip at its opposite ends against transverse movement while permitting longitudinal movement of at least one end of said strip whereby said central apertured portion of said strip bends at elevated temperatures to release said latched end of said control member.

2. An electric control device comprising a bimetal strip having a widened central portion with an aperture therethrough, means pivotally mounting one end of said strip, means restraining the other end of said strip against transverse movement while permitting longitudinal movement thereof, a control member having one end extending within and latched to the rim of said aperture and having an arcuate body portion extending on the low expansion side of said strip, means biasing said control member for movement in the longitudinal direction of said strip, and means responsive to an electric current for heating said strip to bend said central portion and release said control member to move along an arcuate path near said strip.

3. An electric control device comprising an insulating housing, switch contacts within said housing, a switching mechanism for said contacts including an operating handle extending through the front of said housing and a bimetal strip extending from front to rear within said housing, a pair of opposed spaced contact surfaces located adjacent the rear end of said bimetal, means connecting said switch contacts in series circuit relation with said spaced contact surfaces including a conductor extending along the rear of said housing on one side of said switching mechanism and connecting one of said opposed contact surfaces to one of said switch contacts, an electric heating strip element located alongside the high expansion side of said bimetal strip and having rear terminals making plug-in engagement with said contact surfaces, said strip element having a handle portion extending through the front of said housing, and a temperature calibrating member extending along the rear of said housing parallel to said conductor on the opposite side of said switch mechanism and connected to the lower end of said bimetal strip.

4. An electric control device comprising an insulating housing, switch contacts within said housing, a switching mechanism for operating said contacts including an operating handle extending through the front of said housing and a bi-metal strip extending from front to rear within said housing, said bi-metal strip having an enlarged central portion with an aperture therethrough and being supported at its ends for lateral temperature-induced movement of its said central portion, said switching mechanism further including a curved control member extending generally along and within the rear of said housing and having one end portion extending within the aperture of said bi-metal strip from the low expansion side thereof and another end portion pivoted at a point remote from said bi-metal strip, means biasing said control member for pivotal movement toward the front of said housing thereby to operate said contacts when said control member is unlatched from said bi-metal strip, an electrical heating strip located alongside the high expansion side of said bi-metal strip and connected in series circuit relation with said switch contacts, and temperature calibrating means including an adjustable member extending along the rear of said housing beside said curved control member and being connected to the rearmost end of said bi-metal strip for adjusting its lateral position.

5. An electric control device comprising an insulating housing, switch contacts within said housing, a switching mechanism for operating said contacts including an operating handle extending through the front of said housing and a bi-metal strip extending from front to rear within said housing, said bi-metal strip being supported at its ends for lateral temperature-induced movement of its said central portion, said switching mechanism further including a curved control member extending generally along and within the rear of said housing and having one end portion latched to the central portion of said bi-metal strip from the low expansion side thereof and another end portion pivoted at a point remote from said bi-metal strip, means biasing said control member for pivotal movement toward the front of said housing thereby to operate said contacts when said control member is unlatched from said bi-metal strip, an electrical heating strip located alongside the high expansion side of said bi-metal strip and connected in series circuit relation with said switch contacts, and temperature calibrating means including an adjustable member extending along the rear of said housing beside said curved control member and being connected to the rearmost end of said bi-metal strip for adjusting its lateral position.

References Cited in the file of this patent

UNITED STATES PATENTS

| | | |
|---|---|---|
| 1,811,970 | Sachs | June 30, 1931 |
| 2,032,115 | Cobb | Feb. 25, 1936 |
| 2,056,119 | Bentley | Sept. 26, 1936 |
| 2,329,362 | Swingle | Sept. 14, 1943 |
| 2,359,124 | Laidig | Sept. 26, 1944 |
| 2,506,796 | Krieger | May 9, 1950 |
| 2,675,267 | Vaughan | Apr. 13, 1954 |
| 2,755,358 | Dobes et al. | July 7, 1956 |
| 2,831,935 | Page | Apr. 22, 1958 |